(12) United States Patent
Fuchs

(10) Patent No.: US 11,775,859 B2
(45) Date of Patent: Oct. 3, 2023

(54) GENERATING FEATURE VECTORS FROM RDF GRAPHS

(71) Applicant: salesforce.com, inc., San Francisco, CA (US)

(72) Inventor: Matthew Fuchs, Los Gatos, CA (US)

(73) Assignee: Salesforce, Inc., San Francisco, CA (US)

( * ) Notice: Subject to any disclaimer, the term of this patent is extended or adjusted under 35 U.S.C. 154(b) by 1041 days.

(21) Appl. No.: 16/354,648

(22) Filed: Mar. 15, 2019

(65) Prior Publication Data

US 2019/0272478 A1 Sep. 5, 2019

Related U.S. Application Data

(63) Continuation of application No. 14/839,784, filed on Aug. 28, 2015, now Pat. No. 10,235,637.

(51) Int. Cl.
*G06F 16/35* (2019.01)
*G06N 20/00* (2019.01)

(52) U.S. Cl.
CPC .......... *G06N 20/00* (2019.01); *G06F 16/35* (2019.01)

(58) Field of Classification Search
CPC .... G06N 20/00; G06N 5/022; G06F 16/3344; G06F 16/3347; G06F 16/35
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |

(Continued)

OTHER PUBLICATIONS

Semantic University, "Cambridge Semantics—The Smart Data Advantage," 2015, <http://www.cambridgesemantics.com/semantic-university/rdf-101> retrieved Jun. 24, 2015, pp. 6.

(Continued)

*Primary Examiner* — Yuk Ting Choi
(74) *Attorney, Agent, or Firm* — Butzel Long; Donald J. Lecher

(57) ABSTRACT

The technology disclosed describes systems and methods for generating feature vectors from resource description framework (RDF) graphs. Machine learning tasks frequently operate on vectors of features. Available systems for parsing multiple documents often generate RDF graphs. Once a set of interesting features to be considered has been established, the disclosed technology describes systems and methods for generating feature vectors from the RDF graphs for the documents. In one example setting, a machine learning system can use generated feature vectors to determine how interesting a news article might be, or to learn information-of-interest about a specific subject reported in multiple articles. In another example setting, viable interview candidates for a particular job opening can be identified using feature vectors generated from a resume database, using the disclosed systems and methods for generating feature vectors from RDF graphs.

20 Claims, 10 Drawing Sheets

Example Workflow

(56) References Cited

U.S. PATENT DOCUMENTS

| | | |
|---|---|---|
| 5,821,937 A | 10/1998 | Tonelli |
| 5,831,610 A | 11/1998 | Tonelli |
| 5,873,096 A | 2/1999 | Lim |
| 5,918,159 A | 6/1999 | Fomukong |
| 5,963,953 A | 10/1999 | Cram |
| 6,092,083 A | 7/2000 | Brodersen |
| 6,161,149 A | 12/2000 | Achacoso |
| 6,169,534 B1 | 1/2001 | Raffel |
| 6,178,425 B1 | 1/2001 | Brodersen |
| 6,189,011 B1 | 2/2001 | Lim |
| 6,216,135 B1 | 4/2001 | Brodersen |
| 6,233,617 B1 | 5/2001 | Rothwein |
| 6,266,669 B1 | 7/2001 | Brodersen |
| 6,295,530 B1 | 9/2001 | Ritchie |
| 6,324,568 B1 | 11/2001 | Diec |
| 6,324,693 B1 | 11/2001 | Brodersen |
| 6,336,137 B1 | 1/2002 | Lee |
| D454,139 S | 3/2002 | Feldcamp |
| 6,367,077 B1 | 4/2002 | Brodersen |
| 6,393,605 B1 | 5/2002 | Loomans |
| 6,405,220 B1 | 6/2002 | Brodersen |
| 6,434,550 B1 | 8/2002 | Warner |
| 6,446,089 B1 | 9/2002 | Brodersen |
| 6,535,909 B1 | 3/2003 | Rust |
| 6,549,908 B1 | 4/2003 | Loomans |
| 6,553,563 B2 | 4/2003 | Ambrose |
| 6,560,461 B1 | 5/2003 | Fomukong |
| 6,574,635 B2 | 6/2003 | Stauber |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee |
| 6,621,834 B1 | 9/2003 | Scherpbier |
| 6,654,032 B1 | 11/2003 | Zhu |
| 6,665,648 B2 | 12/2003 | Brodersen |
| 6,665,655 B1 | 12/2003 | Warner |
| 6,684,438 B2 | 2/2004 | Brodersen |
| 6,711,565 B1 | 3/2004 | Subramaniam |
| 6,724,399 B1 | 4/2004 | Katchour |
| 6,728,702 B1 | 4/2004 | Subramaniam |
| 6,728,960 B1 | 4/2004 | Loomans |
| 6,732,095 B1 | 5/2004 | Warshavsky |
| 6,732,100 B1 | 5/2004 | Brodersen |
| 6,732,111 B2 | 5/2004 | Brodersen |
| 6,754,681 B2 | 6/2004 | Brodersen |
| 6,763,351 B1 | 7/2004 | Subramaniam |
| 6,763,501 B1 | 7/2004 | Zhu |
| 6,768,904 B2 | 7/2004 | Kim |
| 6,772,229 B1 | 8/2004 | Achacoso |
| 6,782,383 B2 | 8/2004 | Subramaniam |
| 6,804,330 B1 | 10/2004 | Jones |
| 6,826,565 B2 | 11/2004 | Ritchie |
| 6,826,582 B1 | 11/2004 | Chatterjee |
| 6,826,745 B2 | 11/2004 | Coker |
| 6,829,655 B1 | 12/2004 | Huang |
| 6,842,748 B1 | 1/2005 | Warner |
| 6,850,895 B2 | 2/2005 | Brodersen |
| 6,850,949 B2 | 2/2005 | Warner |
| 7,062,502 B1 | 6/2006 | Kesler |
| 7,069,231 B1 | 6/2006 | Cinarkaya |
| 7,069,497 B1 | 6/2006 | Desai |
| 7,181,758 B1 | 2/2007 | Chan |
| 7,289,976 B2 | 10/2007 | Kihneman |
| 7,340,411 B2 | 3/2008 | Cook |
| 7,356,482 B2 | 4/2008 | Frankland |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis |
| 7,620,655 B2 | 11/2009 | Larsson |
| 7,644,052 B1 | 1/2010 | Chang |
| 7,698,160 B2 | 4/2010 | Beaven |
| 7,779,475 B2 | 8/2010 | Jakobson |
| 7,851,004 B2 | 12/2010 | Hirao |
| 8,014,943 B2 | 9/2011 | Jakobson |
| 8,015,495 B2 | 9/2011 | Achacoso |
| 8,032,297 B2 | 10/2011 | Jakobson |
| 8,073,850 B1 | 12/2011 | Steven |
| 8,082,301 B2 | 12/2011 | Ahlgren |
| 8,095,413 B1 | 1/2012 | Beaven |
| 8,095,594 B2 | 1/2012 | Beaven |
| 8,209,308 B2 | 6/2012 | Rueben |
| 8,209,333 B2 | 6/2012 | Hubbard |
| 8,275,836 B2 | 9/2012 | Douglas |
| 8,457,545 B2 | 6/2013 | Chan |
| 8,484,111 B2 | 7/2013 | Sturgeon |
| 8,490,025 B2 | 7/2013 | Jakobson |
| 8,504,945 B2 | 8/2013 | Jakobson |
| 8,510,045 B2 | 8/2013 | Rueben |
| 8,510,664 B2 | 8/2013 | Rueben |
| 8,566,301 B2 | 10/2013 | Rueben |
| 8,646,103 B2 | 2/2014 | Jakobson |
| 8,756,275 B2 | 6/2014 | Jakobson |
| 8,769,004 B2 | 7/2014 | Jakobson |
| 8,769,017 B2 | 7/2014 | Jakobson |
| 9,256,664 B2 * | 2/2016 | Chakerian ............ G06F 16/355 707/741 |
| 2001/0044791 A1 | 11/2001 | Richter |
| 2002/0072951 A1 | 6/2002 | Lee |
| 2002/0082892 A1 | 6/2002 | Raffel |
| 2002/0129352 A1 | 9/2002 | Brodersen |
| 2002/0140731 A1 | 10/2002 | Subramaniam |
| 2002/0143997 A1 | 10/2002 | Huang |
| 2002/0162090 A1 | 10/2002 | Parnell |
| 2002/0165742 A1 | 11/2002 | Robins |
| 2003/0004971 A1 | 1/2003 | Gong |
| 2003/0018705 A1 | 1/2003 | Chen |
| 2003/0018830 A1 | 1/2003 | Chen |
| 2003/0066031 A1 | 4/2003 | Laane |
| 2003/0066032 A1 | 4/2003 | Ramachadran |
| 2003/0069936 A1 | 4/2003 | Warner |
| 2003/0070000 A1 | 4/2003 | Coker |
| 2003/0070004 A1 | 4/2003 | Mukundan |
| 2003/0070005 A1 | 4/2003 | Mukundan |
| 2003/0074418 A1 | 4/2003 | Coker |
| 2003/0120675 A1 | 6/2003 | Stauber |
| 2003/0151633 A1 | 8/2003 | George |
| 2003/0159136 A1 | 8/2003 | Huang |
| 2003/0187921 A1 | 10/2003 | Diec |
| 2003/0189600 A1 | 10/2003 | Gune |
| 2003/0204427 A1 | 10/2003 | Gune |
| 2003/0206192 A1 | 11/2003 | Chen |
| 2003/0225730 A1 | 12/2003 | Warner |
| 2004/0001092 A1 | 1/2004 | Rothwein |
| 2004/0010489 A1 | 1/2004 | Rio |
| 2004/0015981 A1 | 1/2004 | Coker |
| 2004/0027388 A1 | 2/2004 | Berg |
| 2004/0128001 A1 | 7/2004 | Levin |
| 2004/0186860 A1 | 9/2004 | Lee |
| 2004/0193510 A1 | 9/2004 | Catahan |
| 2004/0199489 A1 | 10/2004 | Barnes-Leon |
| 2004/0199536 A1 | 10/2004 | Barnes Leon |
| 2004/0199543 A1 | 10/2004 | Braud |
| 2004/0249854 A1 | 12/2004 | Barnes-Leon |
| 2004/0260534 A1 | 12/2004 | Pak |
| 2004/0260659 A1 | 12/2004 | Chan |
| 2004/0268299 A1 | 12/2004 | Lei |
| 2005/0050555 A1 | 3/2005 | Exley |
| 2005/0091098 A1 | 4/2005 | Brodersen |
| 2006/0021019 A1 | 1/2006 | Hinton |
| 2008/0126397 A1 | 5/2008 | Alexander |
| 2008/0249972 A1 | 10/2008 | Dillon |
| 2009/0012842 A1 | 1/2009 | Srinivasan |
| 2009/0063415 A1 | 3/2009 | Chatfield |
| 2009/0100342 A1 | 4/2009 | Jakobson |
| 2009/0177744 A1 | 7/2009 | Marlow |
| 2011/0106807 A1 | 5/2011 | Srihari |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0158791 A1 * | 6/2012 | Kasneci ............ G06F 16/9024 707/E17.03 |
| 2012/0233137 A1 | 9/2012 | Jakobson |

(56) References Cited

U.S. PATENT DOCUMENTS

| | | |
|---|---|---|
| 2012/0290407 A1 | 11/2012 | Hubbard |
| 2013/0212497 A1 | 8/2013 | Zelenko |
| 2013/0247216 A1 | 9/2013 | Cinarkaya |
| 2014/0156587 A1* | 6/2014 | Momtchev ............ G06F 16/283 707/600 |
| 2014/0244687 A1* | 8/2014 | Shmueli ................. G06F 16/28 707/780 |
| 2015/0339577 A1 | 11/2015 | Waltinger |
| 2016/0034512 A1* | 2/2016 | Singhal .................. G06F 16/35 707/741 |
| 2016/0179945 A1* | 6/2016 | Lastra Diaz .......... G06F 16/284 707/739 |
| 2016/0275347 A1* | 9/2016 | Sukhodolov ......... G06V 30/416 707/741 |

OTHER PUBLICATIONS

Apache Jena, "Pacakge com.hp.hpl.jena.rdf.model," 2015 <https://jena.apache.org/documentation/javadoc/jena/com/hp/hpl/jena/rdf/model/packagesummary.html>, retrieved Jun. 23, 2015, pp. 3.

* cited by examiner

FIG. 1 – Feature Vector Generation Environment

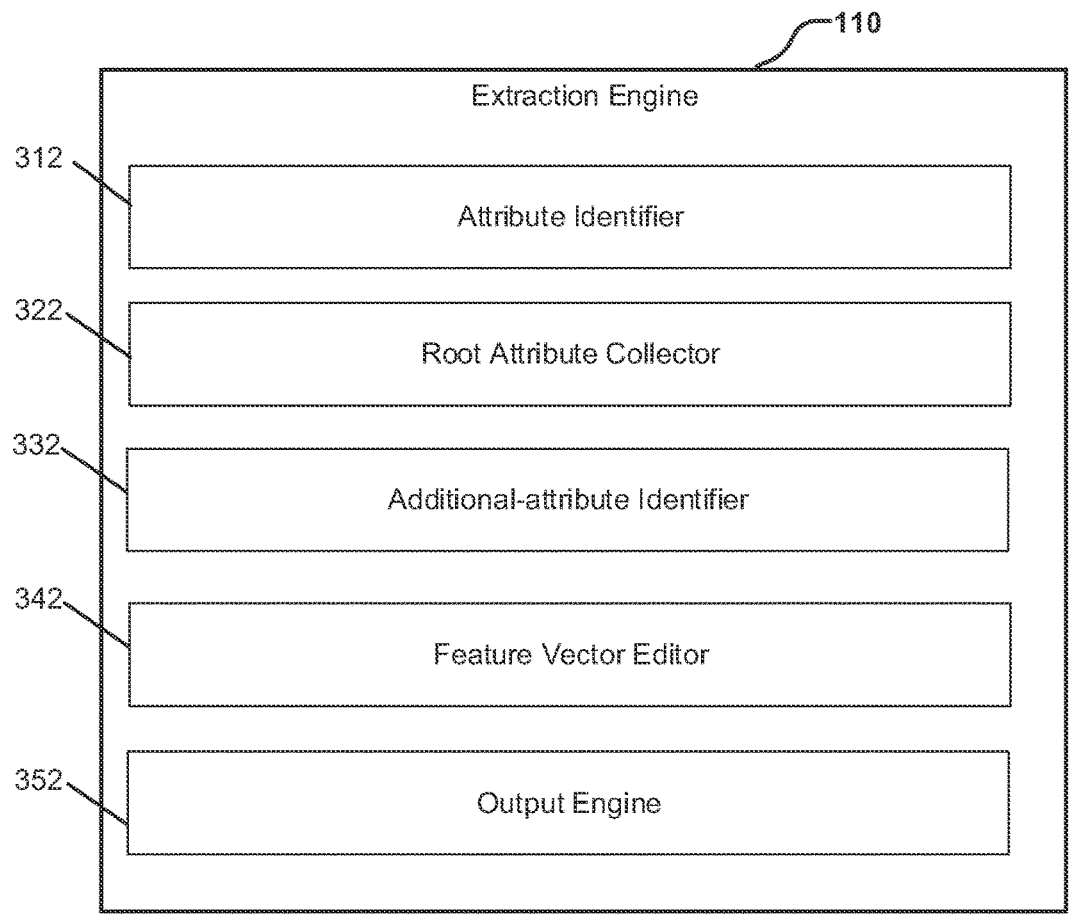
FIG. 3 Block Diagram

400

Another NYSE executive to leave company -WSJ

May 29 (Reuters) - New York Stock Exchange executive Joseph Mecane is set to leave the company during its rapid integration with IntercontinentalExchange Group <ICE.N>, the Wall Street Journal said, citing sources. (http://r.reuters.com/vyb79v)
The news follows a week after the IntercontinentalExchange announced that NYSE chief executive Duncan Niederauer would leave the company in August, six months ahead of his scheduled retirement. [ID:nL3N0O83WC]
Atlanta-based derivatives market and clearing house operator ICE bought NYSE Euronext [NEHL.UL] for more than $10 billion and completed the acquisition in late 2013.
NYSE Euronext <NYX.N> said in October Chief Financial Officer Michael Geltzeiler and General Counsel John Halvey will leave the company shortly after its sale to IntercontinentalExchange. [ID:nL3N0I52KU]
A NYSE spokesperson declined to comment on the news, saying the company does not "comment on rumor or speculation."
Mecane was appointed Executive Vice President and Chief Administrative Officer for NYSE's U.S. Markets from UBS Investment Bank in May 2008.

(Reporting By Kanika Sikka in Bangalore; editing by Andrew Hay) ((kanika.sikka@thomsonreuters.com)(within U.S. +1 646 223 8780, outside U.S. +91 80 6749 1130)(Reuters Messaging: kanika.sikka.thomsonreuters.com@reuters.net))

Keywords: NYSE EXECUTIVES

FIG. 4 Example Article

```
<!--Use of the Calais Web Service is governed by the Terms of Service located at http://www.opencalais.com. By using this service or
the results of the service you agree to these terms of service.-->
<!--Relations: Acquisition, ContactDetails, EmploymentChange, PersonCareer, Quotation,
City: Atlanta
Company: IntercontinentalExchange Group, NYSE Euronext, New York Stock Exchange, UBS Investment Bank, Wall Street Journal
Country: United States
Editor: Andrew Hay
Journalist: Kanika Sikka
Person: Duncan Niederauer, John Halvey, Joseph Mecane, Michael Geltzeiler
PublishedMedium: the Wall Street Journal -->                                542

<rdf:RDF xmlns:rdf="http://www.w3.org/1999/02/22-rdf-syntax-ns#" xmlns:c="http://s.opencalais.com/1/pred/">
<rdf:Description c:calaisRequestID="b6309155-7edd-a647-149d-00f0a374a2ec" c:id="http://id.opencalais.com/
lyNAAIWJBVEr38a3H7Fppg" c:ontology="http://159.220.31.136/owlschema/7.8/onecalais.owl.xml"
rdf:about="http://d.opencalais.com/dochash-1/84f00be4-1a99-3f4e-a0cf-5ce32eb76a9f">
<rdf:type rdf:resource="http://s.opencalais.com/1/type/sys/DocInfo"/><c:document>          552
<![CDATA[                 562
<headline xmlns="http://iptc.org/std/nar/2006-10-01/">Another NYSE executive to leave company -WSJ</headline>
<inlineXML contenttype="application/xhtml+xml" xmlns="http://iptc.org/std/nar/2006-10-01/"><xhtml xmlns="http://www.w3.org/
1999/xhtml">
<body>  May 29 (Reuters) - New York Stock Exchange executive Joseph
Mecane is set to leave the company during its rapid integration with IntercontinentalExchange Group <ICE.N>, the Wall Street
Journal said, citing sources. (http://r.reuters.com/vyb79v)
The news follows a week after the IntercontinentalExchange announced that NYSE chief executive Duncan Niederauer would leave the
company in August, six months ahead of his scheduled retirement. [ID:nL3N0O83WC]
Atlanta-based derivatives market and clearing house operator ICE bought NYSE Euronext[NEHL.UL] for more than $10 billion and
completed the acquisition in late 2013.  NYSE Euronext <NYX.N> said in October Chief Financial Officer Michael Geltzeiler
and General Counsel John Halvey will leave the company shortly after its sale to IntercontinentalExchange. [ID:nL3N0I52KU]
A NYSE spokesperson declined to comment on the news, saying the company does not "comment on rumor or speculation."
Mecane was appointed Executive Vice President and Chief Administrative Officer for NYSE's U.S. Markets from UBS Investment
Bank in May 2008.
***
```

FIG. 5 XML Excerpt page 1 of 2

...

```xml
<rdf:Description rdf:about="http://d.opencalais.com/dochash-1/84f00be4-1a99-3f4e-a0cf-5ce32eb76a91/Relevance/4">
<rdf:type rdf:resource="http://s.opencalais.com/1/type/sys/RelevanceInfo"/>
<c:docId rdf:resource="http://d.opencalais.com/dochash-1/84f00be4-1a99-3f4e-a0cf-5ce32eb76a91"/>
<c:subject rdf:resource="http://d.opencalais.com/comphash-1/b26d9468-51ce-3c5f-a684-2a8f8585b363"/>
<c:relevance>0.2</c:relevance>
</rdf:Description>

<rdf:Description rdf:about="http://d.opencalais.com/genericHasher-1/9d129c5a-473d-3a39-a518-6a580319f1e1">
<rdf:type rdf:resource="http://s.opencalais.com/1/type/em/r/PersonCareer"/>
<!--John Halvey--><c:person rdf:resource="http://d.opencalais.com/pershash-1/44792c0d-6afe-3cac-b8f5-96e60894beca"/>
<c:position>General Counsel</c:position>
<!--NYSE Euronext-->
<c:company rdf:resource="http://d.opencalais.com/comphash-1/b26d9468-51ce-3c5f-a684-2a8f8585b363"/>
<c:careertype>professional</c:careertype>
<c:status>current</c:status>
</rdf:Description>

<rdf:Description rdf:about="http://d.opencalais.com/dochash-1/84f00be4-1a99-3f4e-a0cf-5ce32eb76a91/Instance/6">
<rdf:type rdf:resource="http://s.opencalais.com/1/type/sys/InstanceInfo"/>
<c:docId rdf:resource="http://d.opencalais.com/dochash-1/84f00be4-1a99-3f4e-a0cf-5ce32eb76a91"/>
<c:subject rdf:resource="http://d.opencalais.com/genericHasher-1/9d129c5a-473d-3a39-a518-6a580319f1e1"/>
<!--PersonCareer: person: John Halvey; position: General Counsel; company: NYSE Euronext; careertype: professional; status: current; --><c:detection>
```

...

FIG. 6 XML Excerpt page 2 of 2

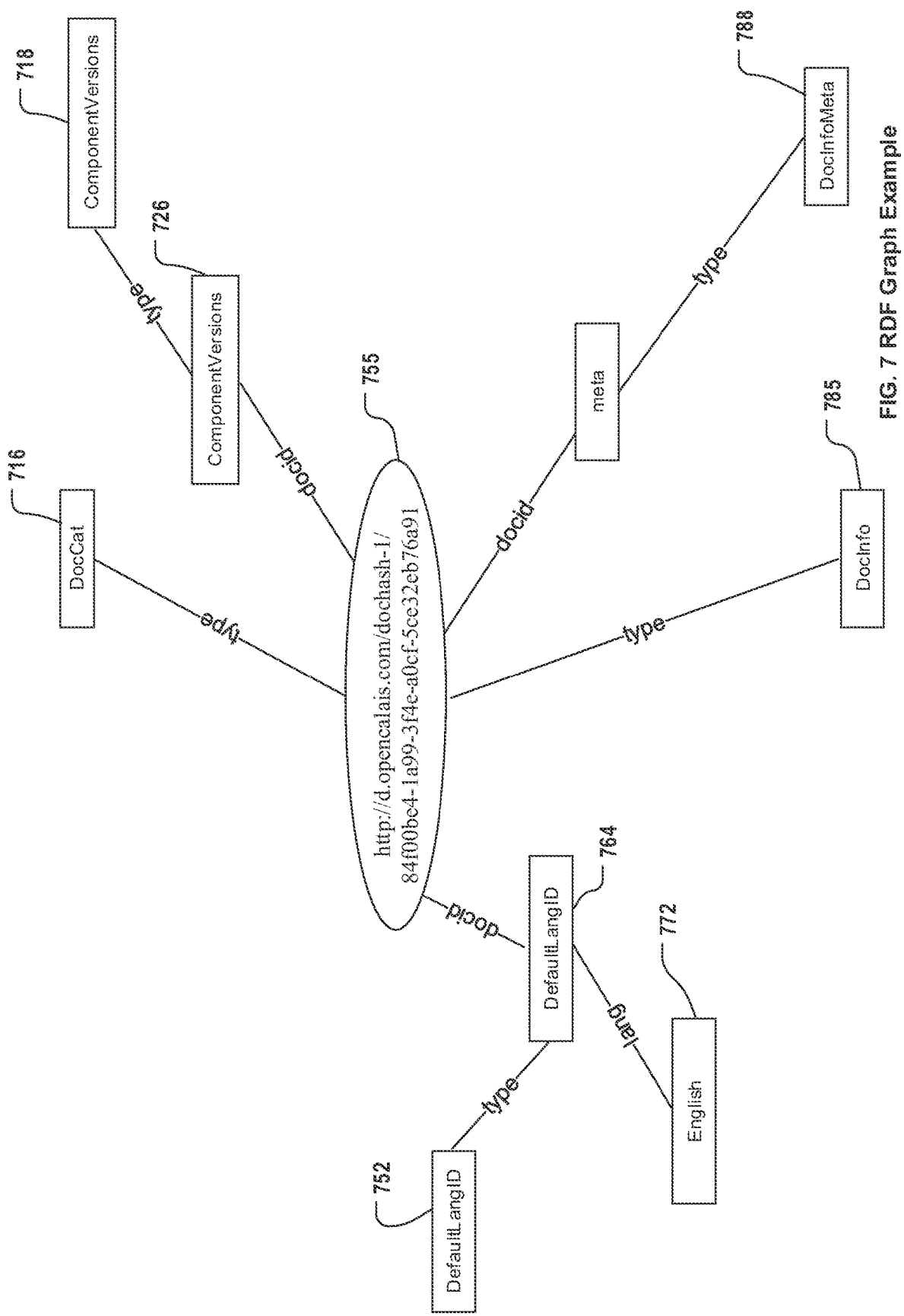
FIG. 7 RDF Graph Example

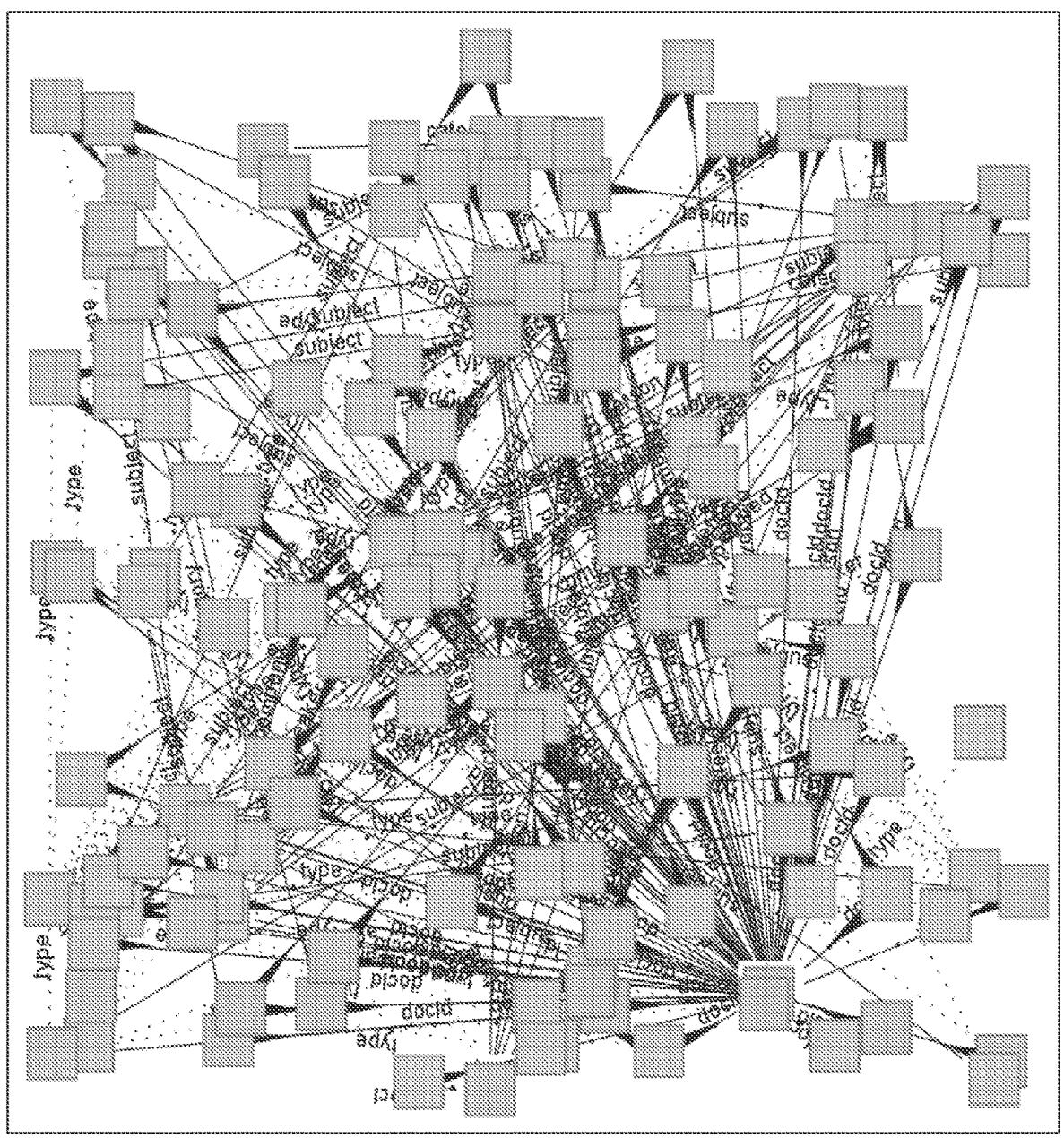
FIG. 8 Complex RDF Graph

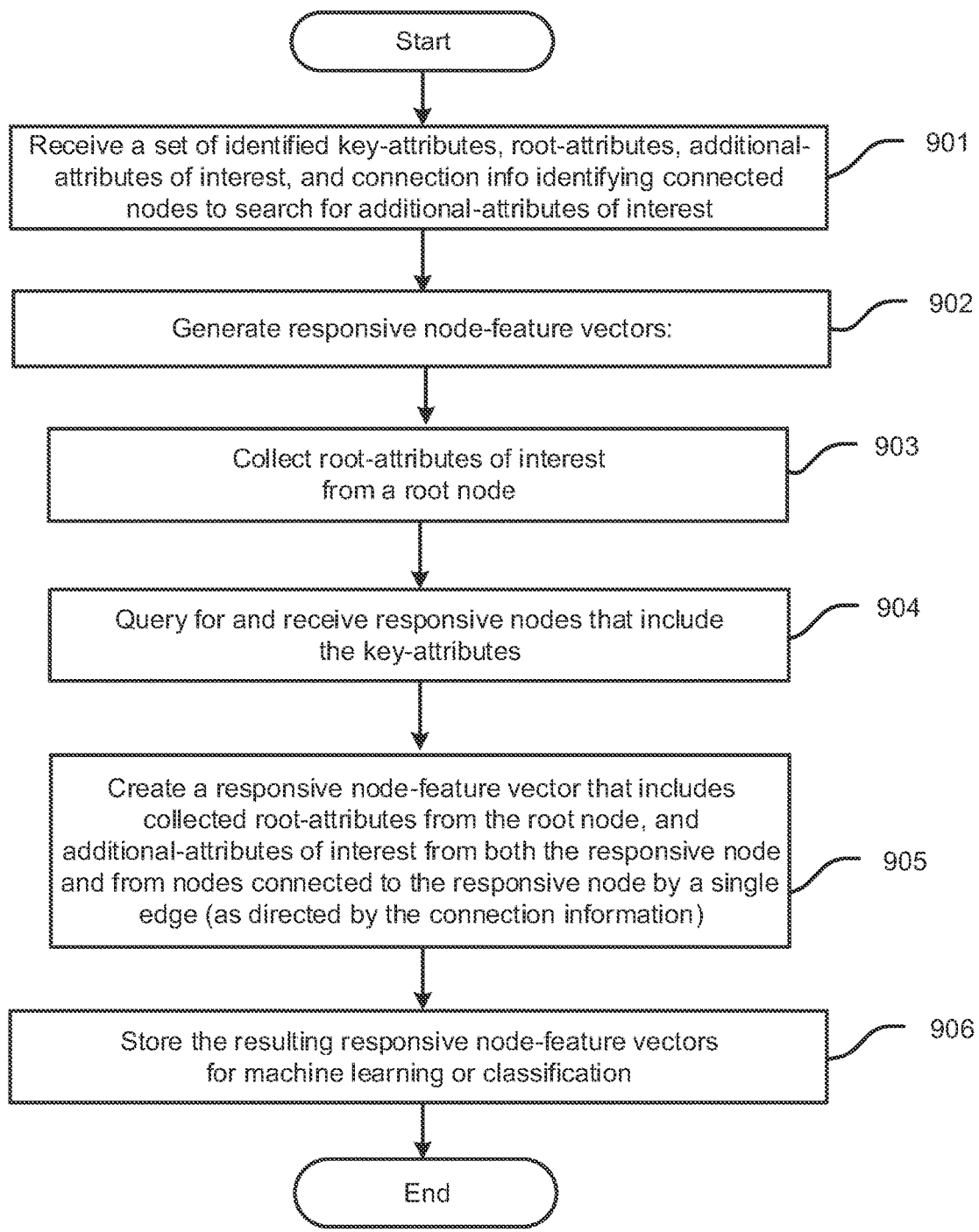
FIG. 9 Example Workflow

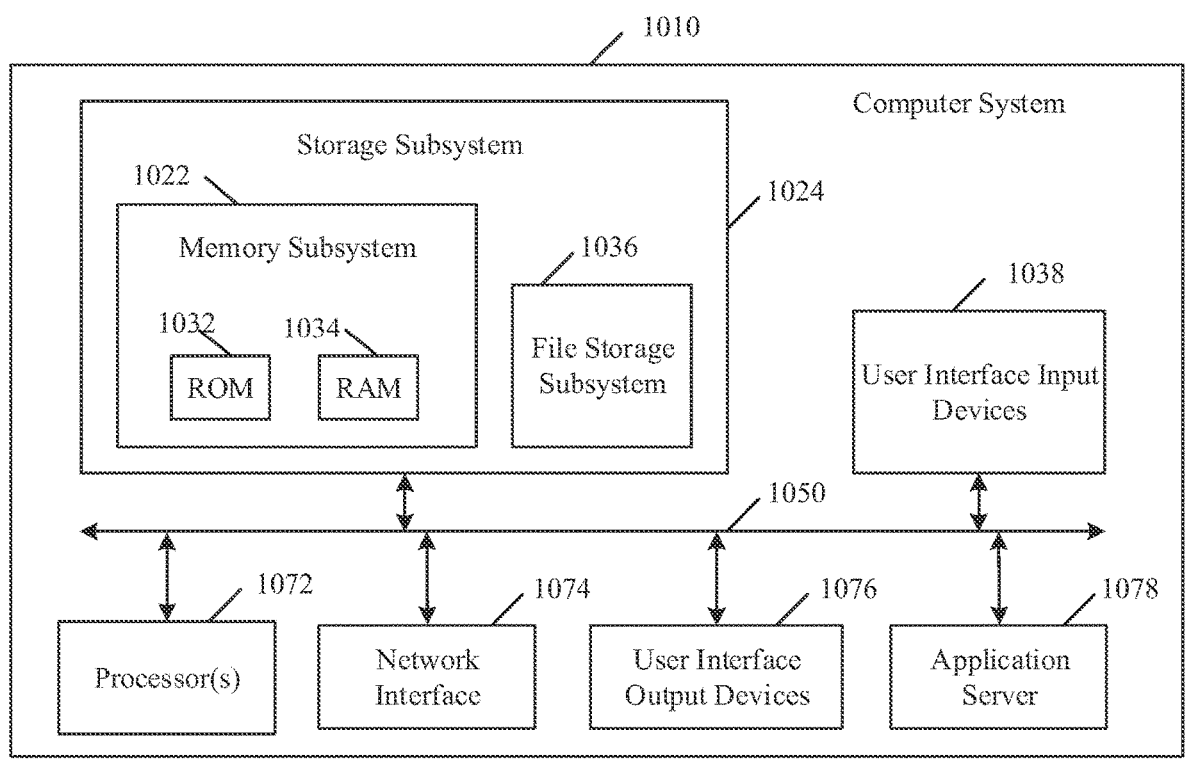
FIG. 10 – Computer System

GENERATING FEATURE VECTORS FROM RDF GRAPHS

FIELD OF DISCLOSURE

The disclosed technology includes a systematic method for generating feature vectors from Resource Description Framework (RDF) graphs. In one example setting, generated feature vectors can be used by a machine learning algorithm to determine how interesting a news article might be, or to collect information about a specific company.

The technology described can be used in a number of machine learning settings and is not limited to the example setting of determining level of interest in an article or subject. In another example, feature vectors generated from RDF graphs can be used to capture job applicants' skills—beginning with an example data set that includes resumes submitted to a large corporation over a defined span of time.

Machine learning tasks frequently operate on vectors of features. There is a need for a systematic way to generate feature vectors from RDF graphs.

BRIEF DESCRIPTION OF THE DRAWINGS

FIG. 3 illustrates a block diagram for a feature extraction engine.

FIG. 4 shows an example of an article from which to extract features.

FIG. 5 shows an example segment of RDF tags added to the article shown in FIG. 4.

FIG. 6 shows additional segments of the article shown in FIG. 4, represented with RDF tags added.

FIG. 7 shows an RDF graph segment for the article of FIG. 4.

FIG. 8 shows the full RDF graph for the article of FIG. 4.

FIG. 9 is an example workflow for generating feature vectors from RDF graphs.

FIG. 10 is a block diagram of an example computer system for generating feature vectors from RDF graphs.

DETAILED DESCRIPTION

The semantic web provides a common framework that allows data to be shared and reused across applications, enterprises, and community boundaries. The Resource Description Framework (RDF) is a key part of the semantic web and the propagation of linked data on the Internet. The RDF standard, promulgated by W3C, describes web resource information, and can be used to represent metadata about Web resources, such as title, author, content and copyright information of web pages. RDF can readily be exchanged between different types of computers using different types of operating systems and various application languages. Example uses of RDF include describing content for search engines, describing time schedules for web events, and describing content and ratings for web images.

RDF presents information as a graph of triples defining nodes and edges. A triple has subject and object nodes and a predicate representing the edge. A node is a URI (also called a resource) or basic data (called a literal), and an edge (also called a property or predicate) is a URI or a string. If two triples share the same subject, then they represent different edges from the same node, and if they share the same object, then they are edges to the same node. A URI is a stream of characters used to identify a name of a resource. In RDF, a resource is any identifiable thing. A statement about a resource is represented using a triple, which includes a subject, predicate or property, an object.

Figure 2:
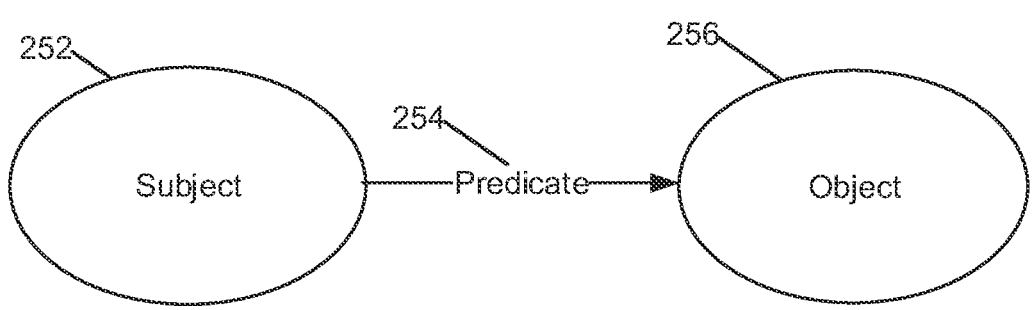
FIG. 2 shows an example of expression mapping for a resource description framework (RDF).

As illustrated in FIG. 2, the subject 252 and object 256 of the triple are modeled as nodes and the predicate 254 is modeled as a directed link that describes the relationship between the nodes. The direction of the directed link points toward the object. The subject is an ID for the resource which is being described by the statement. The subject of an RDF statement is either a uniform resource identifier (URI) or a blank node, both of which denote resources. Resources indicated by blank nodes are called anonymous resources. The predicate (or property) is an ID for the relationship between the subject and the object. The object is either a character string or an ID of another resource, represented as a URI, blank node or a Unicode string literal. The IDs in the subject and predicate, and in the object if it is a resource, are typically formatted as URIs. This triple is effectively modeled as a directed graph, sometimes referred to as a statement. URIs assign unique ID to the subjects, predicates or objects of statements—to make data exchangeable globally.

Underlying RDF is description logic, which links RDF to traditional, symbolic logic-based artificial intelligence (AI). However, descriptive logic is of limited value for machine learning tasks, which frequently operate on vectors of features. Therefore to apply machine learning to RDF, there is a need for a systematic way to generate feature vectors from RDF graphs.

As an example, suppose we want to build a machine learning algorithm to determine what information is available publicly about specific companies, so need to analyze the relevance of each of a large set of articles. Then we would want to generate values for features in the documents, such as how old the article might be, how large the companies mentioned in it are, what kind of events are being described (is it about a criminal investigation, a merger, a change of officers, etc.) Some of these values have date or numeric values. Others, such as what kinds of events are described, are Boolean. Once the set of interesting features has been established, a feature vector for an article can be generated, if the features of interest can be located in the article. To locate the features of interest, the article would need to be parsed.

A widely available system for parsing articles is Calais, by Thomson-Reuters. Calais, however, generates an RDF graph, so a method for generating feature vectors from RDF graphs is needed.

Feature Generation Environment

Figure 1:
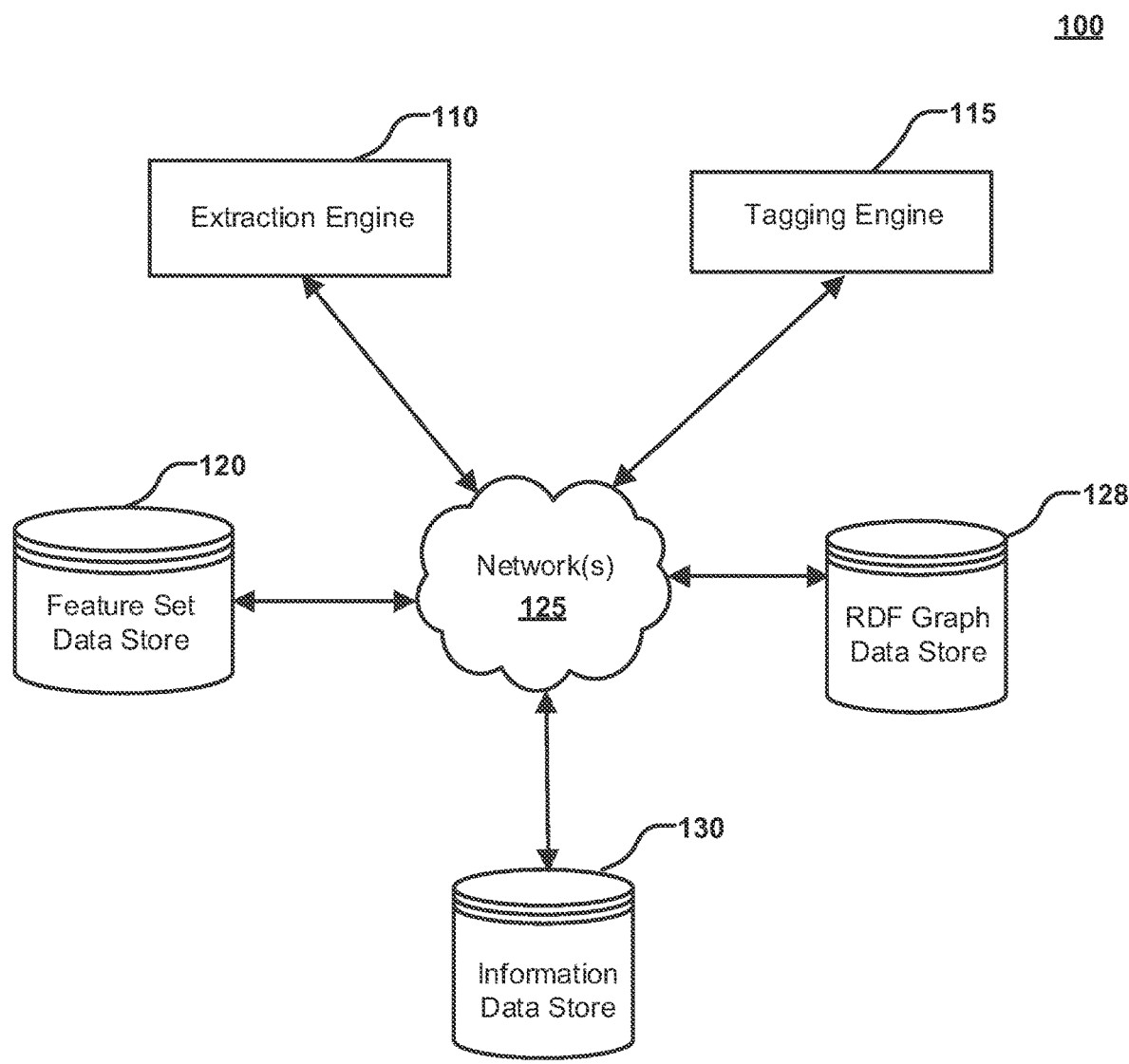
FIG. 1 illustrates one implementation of a feature vector generation environment.

FIG. 1 illustrates one implementation of a feature vector generation environment 100, showing that environment 100 can include an extraction engine 110 and a tagging engine 115. FIG. 1 also includes feature set data store 120, RDF graph data store 128 and information data store 130. In other implementations, environment 100 may not have the same elements as those listed above and/or may have other/different elements instead of, or in addition to, those listed above.

The feature set data store 120 can hold sets of features, also called node-feature vectors, generated for each machine learning question of interest. In some implementations, this feature set can include age of the source of information—for example, information about the publication date of an article. Another feature in the set can be the size of the company discussed in the information source. Yet another feature can be the type of events being described in the article. Examples can include a criminal investigation, a merger, a change of company leadership, etc. The user determines the set of feature subjects, or key-attributes, by naming them.

In one implementation, the machine learning question of interest might relate to choosing resumes of people who meet the qualifications of a specific job. In this case, one feature might be the total number of jobs previously held by a job candidate, and another feature might the programming languages the person lists on their resume.

RDF graph data store 128 can hold nodes and edges containing subjects, predicates, and objects that represent news articles that may contain answers to questions being asked about a company. In another example, the RDF graph data store 128 can hold nodes and edges with subjects, predicates and objects that represent resume features of potential interest. For example, feature subject values may include a last name of 'Faust, with 'Salesforce' as a predicate value, and 'C programming' as an object. In one implementation, a NoSQL database with data stored in rows of (key, value) pairs is an alternative for storing data from sources. A characteristic shared between NoSQL data stores and RDF graph data stores is that the extraction of structure is not on an automated basis, so searching can be applied based on multiple associations.

Information data store 130 can hold hundreds of thousands of articles of potential interest for use in completing machine learning tasks. In one example, a full year of New York Times articles may be stored. In another example, a large technical company may store all resumes received during the past 2 years.

Tagging engine 115 can apply a meta-search engine such as Bing, Google or Yahoo, to find articles that apply to a machine learning problem of interest, and then store the results in information data store 130. Tagging engine 115 parses articles stored in information data store 130 to generate RDF graphs, and stores the results in RDF graph data store 128. In one example implementation, the 'Open Calais' tool provided by Thomson Reuters processes article text submitted from information data store 130, and returns RDF graphs with subject, predicate, and object nodes. For the Open Calais example implementation for analyzing news articles, node and edge content can include entities, topic codes, events, relations and social tags.

Extraction engine 110 accesses feature set data store 120 to identify what set of features to use to train a machine learning task. Additionally, extraction engine 110 determines how many feature vectors to generate for the task. For example, when analyzing an article, multiple people may be mentioned and the goal is to determine, for each person, how interesting the article is to someone interested in that person. Therefore, we would need a feature vector with (feature subject, feature value) pairs for each person mentioned in the article.

After identifying a set of features, extraction engine 110 identifies which RDF nodes to visit to generate feature vectors of (feature subject, feature value) pairs from identified key-attributes, root-attributes and additional-attributes of interest. The RDF graph for an article may be huge, so we need to ensure that we only peruse the portion that could be useful. Even in the context of an article, many nodes may be concerned with metadata, and therefore not be of interest for the identified machine learning task. If we want to evaluate all of the people mentioned in an article, then we find all of the 'person' nodes. In one example, for a single article with only 250 lines of text, Calais generates an XML file that contains over 700 RDF tags.

After identifying key-attributes (node names of interest) and root-attributes, extraction engine 110 examines the RDF near the identified root-attributes (nodes) and forms feature vectors, as described later. For the example described above, we generate a feature vector for each person in the article.

FIG. 3 illustrates functional blocks of extraction engine 110. Attribute identifier 312 selects features of a training set that match an identified machine learning task, and determines how many feature vectors to generate. Knowing the key-attributes (node names of interest) of the feature vector is key for identifying which article features are attributes of interest. Continuing the example from earlier, after we find the person nodes for a news article, we can generate a feature value for each person. In many cases, root attribute nodes are only useful if a particular path (edge) exists from them to the subject (person). For example, suppose an article mentions an arrest of 'person K'. If we are building a feature vector for person M, then this is not interesting, so the 'wasArrested' feature value gets set to false. However, a mention of 'person K' assaulting 'person M' is interesting, so that information gets mapped to the feature vector for the subject (person).

Root attribute collector 322 identifies a set of nodes in the RDF graph for a document, based on the topic to be evaluated. Continuing the example from earlier, given that we want to evaluate the people mentioned in an article, we collect the root-attributes based on the identified attribute, for example, root nodes pointing to the name of a specific person. This collection of root-attributes is called the subgraph of interest (SOI). Additional-attribute identifier 332 determines information inferred from the document, and can also include information stored in a repository such as information data store 130—combining data in one of the responsive nodes with an external data source to generate an additional-attribute of interest. In one example, the Calais database includes articles tagged with a permID—a unique identifier used to identify a specific entity; i.e., permID=5000017806 refers to a company named 'NYSE Euronext'. Further information about NYSE Euronext can be gleaned from external data also stored in information data store 130.

Feature vector editor 342 examines the neighborhood of the SOI node and creates or updates some number (zero or more) of attributes. Features are stored so that a single 'get-put' operation can be used to retrieve or update the value of any attribute. A feature name to feature value map constitutes the features vector: a set of (key-attribute, value-of-attribute) pairs. Output engine 352 delivers the feature vectors of the RDF graph for the document—a set of feature vectors that can be used to evaluate a machine learning system or that can be stored in feature set data store 120 for later use for machine learning or machine classification.

The body of knowledge modeled by a collection of RDF statements may be subjected to reification, a process in which an abstract idea is turned into an explicit data model. A computable/addressable object—a resource—is created as a proxy for a non-computable/addressable object. By means of reification, something that was previously implicit, unexpressed, and possibly inexpressible is explicitly formulated and made available to conceptual (logical or computational) manipulation. For example, each statement (that is, each triple subject-predicate-object together) can be assigned a URI and treated as a resource about which additional statements can be made, such as, "NYSE Euronext says that John Halvey will leave the company."

Reification is important in order to deduce a degree of usefulness for each statement, such as determining feature values of 'true' or 'false' for Boolean features. In a reified RDF system, each original statement, being a resource itself, most likely has at least three additional statements made about it: one to assert that its subject is some resource, one to assert that its predicate is some resource, and one to assert that its object is some resource or literal. Using the set of identified key-attributes, we can derive a Boolean value additional-attribute of interest from data in the responsive node or a node connected by a single edge to the responsive node.

For RDF implementations, it is sometimes useful to group statements according to different criteria. For example, a statement can be associated with a context, named by a URI, in order to assert an 'is true in' relationship between a feature subject and a feature value. As another example, one can group statements by their source, which can be identified by a URI, such as the URI of a particular RDF/XML document.

Feature vectors can be serially generated for a body of documents. Even a small article can produce a complex RDF graph which can be navigated to produce feature vectors for feature attributes of interest. For some machine learning tasks—such as the example of analyzing thousands of documents (news articles) to identify interesting events related to a specific company, a set of feature vectors populated with attribute values make it possible to efficiently to determine "answers" to ML questions about the company. The same set of RDF graphs that represent the same thousands of documents can be used to generate distinct sets of feature vectors for many different key-attributes (node names of interest).

In one example, information data store 130 includes the 26 line article shown in FIG. 4, which contains 187 words. Tagging engine 115 parses the article and stores the resulting 2376-line XML file with RDF tags in information data store 130. The XML file for the short article includes more than 700 RDF tags, and includes 142 instances of the URI 'http://d.opencalais.com/dochash-1/84f00be4-1a99-3f4e-a0cf-5ce32eb76a91'.

XML code is a serialized representation of an RDF graph. FIG. 5 and FIG. 6 show excerpts of the XML file for the article shown in FIG. 4. For example, RDF tag 542 identifies the namespace name (xmlns) for the article; and RDF type tag 562 identifies the RDF resource for document information. RDF tag for description 610 includes a feature value that reflects the relevance to the article of a given instance of a tagged resource. For example, in the description shown in FIG. 6, a low relevance of 0.2 622 conveys that the information is mentioned, but is not the subject of the article.

An example graph segment shows common relationships between article root nodes and edges: RDF graph 700 in FIG. 7 shows the graph for 12 lines of code excerpted from the XML file for the article of FIG. 4, and listed below. Instances of URI 'http://d.opencalais.com/dochash-1/84f00be4-1a99-3f4e-a0cf-5ce32eb76a91' 552, 614, 624, 644, 654 can be mapped as shown in FIG. 7.

```
<rdf:Description rdf:about="http://d.opencalais.com/dochash-1/84f00be4-1a99-
3f4e-a0cf-5ce32eb76a91/lid/DefaultLangId">
<rdf:type rdf:resource="http://s.opencalais.com/1/type/lid/DefaultLangId"/>
<c:docId rdf:resource="http://d.opencalais.com/dochash-1/84f00be4-1a99-3f4e-
a0cf-5ce32eb76a91"/>
<c:lang rdf:resource="http://d.opencalais.com/lid/DefaultLangId/English"/>
...
<rdf:type rdf:resource="http://s.opencalais.com/1/type/sys/DocInfo"/>
...
<rdf:Description c:contentType="text/xml"c:language="English"
c:processingVer="CalaisDirect" :serverVersion="OneCalais_7.8-RELEASE:344"
c:submissionDate="2014-11-21 01:54:46.967
"rdf:about="http://d.opencalais.com/dochash-1/84f00be4-1a99-3f4e-a0cf-
5ce32eb76a91/meta">
<rdf:type rdf:resource="http://s.opencalais.com/1/type/sys/DocInfoMeta"/>
...
<rdf:type rdf:resource="http://s.opencalais.com/1/type/cat/DocCat"/>
...
<rdf:Description rdf:about="http://d.opencalais.com/dochash-1/84f00be4-1a99-
3f4e-a0cf-5ce32eb76a91/ComponentVersions">
<rdf:type
rdf:resource="http://s.opencalais.com/1/type/sys/ComponentVersions"/>
```

URI 755 maps to document information 785, component versions 726, and default language identifiers 764. Object English 772 maps via predicate 'lung' from the default language identifier 764. 'Type' predicate connects URI 755 to document category DocCat 716. The example metadata nodes show a tiny glimpse of the complexity of a single RDF graph.

In one implementation, the information in over 50,000 articles represented by 50,000 XML files was used to populate feature vectors—determining attribute values for attribute subjects of interest. Resultant feature vectors are often sparsely populated, since each article is specific to some focused topic. In one implementation, these sparse feature vectors can be traversed hundreds of times to answer different ML questions about companies—effectively gleaning content from the documents represented by the feature vectors.

FIG. 8 shows the full complex RDF graph for the XML code for the article included in FIG. 4, which includes 26 lines of text. This graph provides a glimpse of how quickly the complexity of the RDF graph increases for even an average-sized article; and shows why a need exists for a systematic way to generate feature vectors from RDF graphs.

Five feature vectors for the example article of FIG. 4 are listed below. One set of (attribute subject, attribute value) pairs is defined for each company mentioned in the article. Some attribute subjects are defined by the person setting up the feature list of interest, such as 'commonWords', which is an attribute used to determine whether the document is an article rather than a table of financial data. Other features can have the same value for multiple feature vectors; for example, 'bodyLength', with a value of 1372 for each of the five feature vectors listed, because the source of the five feature vectors is the same article. Some features in the plurality of responsive node-feature vectors are generated by interpreting content in the RDF graph, such as 'Acquisition' and 'EmploymentChange'. The PermID attribute can be used to identify additional attributes-of-interest stored in information data store 130 for the company specified by the key-attributes of the feature vector. Ricks represents a stock exchange ticker symbol.

---

[docname:20140530-000230000-nL3N0OF54E-1-2.xml],
[headline:Another NYSE executive to leave company -WSJ],
[commonWords:53],
[docdate:20140530],
[company_name:UBS Investment Bank],
[permid:4296738253],
[bodyLength:1372],
[ricks:3],
[relevance:0.2],
[resolved_company_name:UBS LIMITED],
[docname:20140530-000230000-nL3N0OF54E-1-2.xml],
[Acquisition:true],
[headline:Another NYSE executive to leave company -WSJ],
[commonWords:53],
[docdate:20140530],
[company_name:IntercontinentalExchange Group],
[permid:4298008270],
[bodyLength:1372],
[ricks:3],
[relevance:0.8],
[resolved_company_name:INTERCONTINENTAL EXCHANGE HOLDINGS, INC.],
[docname:20140530-000230000-nL3N0OF54E-1-2.xml],
[headline:Another NYSE executive to leave company -WSJ],
[commonWords:53],
[docdate:20140530],
[company_name:New York Stock Exchange],
[permid:8589934165],
[bodyLength:1372],
[ricks:3],
[relevance:0.0],
[resolved_company_name:NEW YORK STOCK EXCHANGE LLC],
[PersonCareer:true],
[EmploymentChange:true],
[docname:20140530-000230000-nL3N0OF54E-1-2.xml],
[headline:Another NYSE executive to leave company -WSJ],
[commonWords:53],
[docdate:20140530],
[company_name:Wall Street Journal],
[permid:4295903135],
[bodyLength:1372],
[ricks:3],
[relevance:0.0],
[resolved_company_name:DOW JONES & COMPANY, INC.],
[docname:20140530-000230000-nL3N0OF54E-1-2.xml],
[Acquisition:true],
[headline:Another NYSE executive to leave company -WSJ],
[commonWords:53],
[docdate:20140530],
[company_name:NYSE Euronext],
[permid:5000017806], -continued

[bodyLength:1372],
[ricks:3],
[relevance:0.2],
[resolved_company_name:NYSE EURONEXT],
[PersonCareer:true],

---

Key-attributes, root-attributes and additional-attributes of interest (feature subjects) can be identified for a specific machine learning question to be answered. Feature values are determined by identifying information in the document of interest. After collecting the root-attributes of interest from a root node of the document, and querying for and receiving responsive nodes in the RDF graph that include the key-attributes (node names of interest), the feature values are determined from information in the collected root-attributes in each responsive node-feature vector, from the attributes of interest from the responsive node, and from nodes connected by a single edge to the responsive node. As computing power continues to grow, connection by a sequence of edges is a natural extension of the technology disclosed. Referring to a single edge describes the starting point for applying this technology and is not intended to exclude more complex traversal, such as two edges or three edges or more edges. In some applications, for a particular data realm, it will be nearly as easy to describe a two edge traversal to information of interest in a document as to describe a single edge traversal. In other applications with rich branching off a first, single edge, the logic that needs to be specified will be more complex.

In one implementation example, the document is an article or series of articles. In another implementation, a document can be a resume or group of resumes for a business that wants to hire a new engineer.

Attribute values can be inferred from data in the documents of interest. Also, related attributes of interest can be gleaned from a database, based on information in the feature vector, such as the permID. In one example, Calais resolves the permID and searches for related articles and feature vectors stored in the database. In some implementations, the XML serialized representation of the RDF graph can be converted to a queryable RDF graph and stored in RDF graph data store 128. In one example, an Apache Jena semantic web framework can be used to represent the XML as an RDF graph, and the framework tools can be used for querying the resultant graph. For example, a user can identify companies of interest, and the system can query the database of key-attributes (i.e. company names) to determine feature values. A set of arrays of features are needed for machine learning. Example XML description code, shown below for the article in FIG. 4, includes an 'acquisition' node. The 'acquisition' key-attribute for a company would be updated to 'true' based on inference, using the XML representation of the RDF, as shown in the fifth feature vector listed above.

---

<rdf:Description rdf:about="http://d.opencalais.com/er/acquisition/ralg-deal1/2479748020">

<rdf:type rdf:resource="http://s.opencalais.com/1/type/er/Acquisition"/>

<c:docId rdf:resource="http://d.opencalais.com/dochash-1/84f00be4-1a99-3f4e-a0cf-5ce32eb76a91"/>

<c:dealid>2479748020</c:dealid>

<c:subject rdf:resource="http://d.opencalais.com/genericHasher-1/7cc27ef3-36ae-33db-87e9-44c02f246e54"/>

</rdf:Description>

Feature vectors, such as those generated using the method described above, can be used as a training set for a machine learning question. Alternatively, the feature vectors can be stored for later use.

FIG. 9 shows the flow 900 of one implementation for generating feature vectors from RDF graphs. Other implementations may perform the steps in different orders and/or with different, fewer or additional steps than the ones illustrated in FIG. 9. Multiple steps can be combined in some implementations.

At action 901, the extraction engine 110 receives a set of identified key-attributes, root-attributes, additional-attributes of interest, and connection information identifying connected nodes to search for at least some of the additional-attributes of interest. At action 902, the generation of responsive node-feature vectors occurs, as follows. At action 903, root attribute collector 322 collects feature vector root-attributes of interest from a root node.

At action 904, additional-attribute identifier 332 queries for and receives responsive nodes that include the key-attributes of the RDF graph. At action 905, additional-attribute identifier 332 creates a responsive node-feature vector that includes: at least some of the collected root-attributes from the root node; the additional-attributes of interest present in the responsive node; and the additional-attributes of interest present in connected nodes, as directed by the connection information, from nodes connected to the responsive node by a single edge.

At action 906, a user can store the resulting responsive node-feature vectors for machine learning or classification.

Computer System

FIG. 10 is a block diagram of an example computer system 1000, according to one implementation. The processor can be an ASIC or RISC processor. It can be an FPGA or other logic or gate array. It can include graphic processing unit (GPU) resources. Computer system 1010 typically includes at least one processor 1072 that communicates with a number of peripheral devices via bus subsystem 1050. These peripheral devices may include a storage subsystem 1024 including, for example, memory devices and a file storage subsystem, user interface input devices 1038, user interface output devices 1076, and a network interface subsystem 1074. The input and output devices allow user interaction with computer system 1010. Network interface subsystem 1074 provides an interface to outside networks, including an interface to corresponding interface devices in other computer systems.

User interface input devices 1038 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1010.

User interface output devices 1076 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the methods described herein. This software is generally executed by processor 1072 alone or in combination with other processors.

Memory 1022 used in the storage subsystem can include a number of memories including a main random access memory (RAM) 1034 for storage of instructions and data during program execution and a read only memory (ROM) 1032 in which fixed instructions are stored. A file storage subsystem 1036 can provide persistent storage for program and data files, and may include a hard disk drive, a floppy disk drive along with associated removable media, a CD-ROM drive, an optical drive, or removable media cartridges. The software used to implement the functionality of certain systems may be stored by file storage subsystem 1036 in the storage subsystem 1024, or in other machines accessible by the processor.

Bus subsystem 1050 provides a mechanism for letting the various components and subsystems of computer system 1010 communicate with each other as intended. Although bus subsystem 1050 is shown schematically as a single bus, alternative implementations of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as one example. Many other configurations of computer system 1010 are possible having more or fewer components than the computer system depicted in FIG. 10.

Particular Implementations

In one implementation, a method of preparing feature vectors suitable for machine learning, machine classification or populating databases from a resource description framework, abbreviated RDF, graph of a document, includes receiving a set of identified key-attributes (node names of interest), root-attributes, additional-attributes of interest; and connection information identifying connected nodes to search for at least some of the additional-attributes of interest. The method includes generating a plurality of responsive node-feature vectors for a document represented as an RDF graph. This implementation includes collecting the root-attributes of interest from a root node of the document and querying for and receiving responsive nodes in the RDF graph that include the key-attributes. The method further includes creating a responsive node-feature vector for each responsive node, wherein the responsive node-feature vector includes: from the root node, at least some of the collected root-attributes; from the responsive node, the additional-attributes of interest present in the responsive node; and, from nodes connected to the responsive node by a single edge, the additional-attributes of interest present in connected nodes, as directed by the connection information. Further, this method includes storing the plurality of responsive node-feature vectors for machine learning or machine classification.

The disclosed method of preparing feature vectors can be extended using connection information. In addition to attributes of interest, the method can include receiving connection information identifying connected nodes to search for at least some of the additional-attributes of interest. This connection information can be used to add information from connected nodes linked by a single edge to the responsive node-feature vector.

This method can further include, with the set of identified key-attributes, specification of at least one node-type of interest that includes a particular key-attribute. The method can also include, with the set of identified key-attributes, derivation of a Boolean value additional-attribute of interest from data in the responsive node or a node connected by a single edge to the responsive node. Additionally, the method can include in the connection information, second additional-attributes of interest connected by a second edge to the node connected by the single edge to the responsive node; and can generate at least one additional responsive node feature vector using information from the second additional attributes of interest.

In some implementations, a method of preparing feature vectors suitable for machine learning or machine classification from an RDF graph of a document further includes with the set of identified key-attributes, a derivation of an additional-attribute of interest from data in the responsive node or a node connected by a single edge to the responsive node. The method can further include combining data in one of the responsive nodes with an external data source to derive an additional-attribute of interest.

In some implementations, a method of preparing feature vectors suitable for machine learning or machine classification from an RDF graph of a document further includes, with the set of identified additional-attributes, specification of at least one connected-additional-attribute that is in a node connected by a single edge to a particular responsive node-type and also including an edge-identifier that connects the connected-additional-attribute to the particular responsive node. This method also includes with the set of identified key-attributes, specification of a node-type of interest responsive to a query for a particular key-attribute; and with the set of identified additional-attributes, specification of at least one connected-additional-attribute that is in a node connected by a single edge to the node-type and an edge-identifier that connects the connected-additional-attribute to the node-type In one implementation, a method of preparing feature vectors suitable for machine learning or machine classification from an RDF graph of a document further includes manually curating a multitude of at least 100 of the responsive node-feature vectors and using the curated responsive node-feature vectors as a training set for machine learning. A method can further include using confidence scores in the RDF graph to qualify a multitude of at least 100 of the responsive node-feature vectors and using the qualified responsive node-feature vectors as a training set for machine learning.

A method can further include using a multitude of at least 100,000 of the responsive node-feature vectors as a training set for unsupervised machine learning.

In some implementations, the method is enhanced by further including classifying a multitude of at least 100 of the responsive node-feature vectors using a classifier trained using curated responsive node-feature vectors as a training set.

Other implementations may include a computer implemented system to perform any of the methods described above, the system including a processor, memory coupled to the processor, and computer instructions loaded into the memory.

Yet another implementation may include a tangible non-transitory computer readable storage medium including computer program instructions that cause a computer to implement any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method for identifying a first document relevant to a topic of interest, the method comprising:
    producing, by a processor, a Resource Description Framework (RDF) graph of a second document, wherein the RDF graph includes a plurality of nodes and at least one edge node;
    receiving the topic of interest to be evaluated;
    determining, by the processor and based on the RDF graph,
        key-attributes identified from nodes in the RDF graph responsive to the topic of interest to be evaluated,
        root node-attributes collected from root nodes in the RDF graph pointing to the topic of interest to be evaluated, and
        a Boolean value additional-attribute of interest derived from the identified key-attributes in one of the responsive node or a node connected by a single edge to the responsive node, wherein the Boolean value additional-attribute of interest is one of a true or false feature value;
    generating, by the processor, feature vectors based on a feature value of the identified key-attributes, a feature subject of the root node-attributes, and a determined "true" value of the Boolean value additional-attribute of interest; and
    producing, by the processor and using a machine learning algorithm and the feature vectors, computer instructions configured to identify, in response to a receipt of the first document, that the first document is relevant to the received topic of interest.

2. The method of claim 1, further comprising storing, by the processor, the feature vectors.

3. The method of claim 1, further comprising storing, by the processor, the RDF graph.

4. The method of claim 1, wherein the producing the RDF graph comprises parsing the second document.

5. The method of claim 4, wherein the parsing comprises:
    extracting, using a natural language processing technology, semantic information from unstructured text in the second document; and
    generating, from the semantic information, a serialized representation of the RDF graph.

6. The method of claim 5, wherein the serialized representation comprises a markup language file.

7. The method of claim 5, further comprising converting the serialized representation of the RDF graph to a form that is capable of being queried.

8. The method of claim 1, wherein the generating comprises:
    determining a set of features relevant to the topic of interest; and
    identifying, in the RDF graph, a first node, the first node being identified by a feature of the set of features.

9. The method of claim 8, wherein the determining the set of features comprises receiving the set of features.

10. The method of claim 8, wherein the generating further comprises determining, from the first node, a value of the feature.

11. The method of claim 10, wherein the value is based on a degree of relevance of the feature to the topic of interest.

12. The method of claim 8, wherein the generating further comprises identifying, in the RDF graph, a second node, the second node being a subject node of a triple in the RDF graph, the first node being an object node of the triple.

13. The method of claim 12, wherein the identifying the second node comprises:
querying the RDF graph; and
receiving, in response to a query of the RDF graph, the second node.

14. The method of claim 12, wherein a subgraph of interest comprises the first node and the second node.

15. The method of claim 14, wherein the attribute determined from the information external to the second document is based on a node of the subgraph of interest.

16. The method of claim 12, wherein the generating further comprises identifying, in the RDF graph, a third node, the third node being connected, in the RDF graph, to a node of the subgraph of interest by an edge.

17. The method of claim 16, wherein the edge is a sequence of edges.

18. The method of claim 1, further comprising searching, by the processor, for a third document, wherein:
the third document is associated with a feature vector having a feature that identifies an entity associated with the third document;
at least one of the feature vectors associated the second document includes a feature that identifies an entity associated with the second document; and
the entity associated with the second document is the entity associated with the third document.

19. A non-transitory computer-readable medium storing computer code for identifying a first document relevant to a topic of interest, the computer code including instructions to cause the processor to:
produce a Resource Description Framework (RDF) graph of a second document, wherein the RDF graph includes a plurality of nodes and at least one edge node;
receive the topic of interest to be evaluated;
determine, based on the RDF graph, key-attributes identified from nodes in the RDF graph responsive to the topic of interest to be evaluated,
root node-attributes collected from root nodes in the RDF graph pointing to the topic of interest to be evaluated, and
a Boolean value additional-attribute of interest derived from the identified key-attributes in one of the responsive node or a node connected by a single edge to the responsive node, wherein the Boolean value additional-attribute of interest is one of a true or false feature value;
generate feature vectors based on a feature value of the identified key-attributes, a feature subject of the root node-attributes, and a determined "true" value of the Boolean value additional-attribute of interest; and
produce, using a machine learning algorithm and the feature vectors, computer instructions configured to identify, in response to a receipt of the first document, that the first document is relevant to the received topic of interest.

20. A system identifying a first document relevant to a topic of interest, the system comprising:
a memory configured to store the first document, a second document, a Resource Description Framework (RDF) graph, and feature vectors; and
a processor configured to:
produce the RDF graph of the second document, wherein the RDF graph includes a plurality of nodes and at least one edge node;
receive the topic of interest to be evaluated;
determine, based on the RDF graph, key-attributes identified from nodes in the RDF graph responsive to the topic of interest to be evaluated,
root node-attributes collected from root nodes in the RDF graph pointing to the topic of interest to be evaluated, and
a Boolean value additional-attribute of interest derived from the identified key-attributes in one of the responsive node or a node connected by a single edge to the responsive node, wherein the Boolean value additional-attribute of interest is one of a true or false feature value;
generate feature vectors based on a feature value of the identified key-attributes, a feature subject of the root node-attributes, and a determined "true" value of the Boolean value additional-attribute of interest; and
produce, using a machine learning algorithm and the feature vectors, computer instructions configured to identify, in response to a receipt of the first document, that the first document is relevant to the received topic of interest.

* * * * *